(12) United States Patent
Chen et al.

(10) Patent No.: US 8,571,343 B2
(45) Date of Patent: Oct. 29, 2013

(54) METHODS AND SYSTEMS FOR DOCUMENT-IMAGE CORRECTION

(75) Inventors: Lawrence Shao-hsien Chen, Vancouver, WA (US); Richard John Campbell, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 60 days.

(21) Appl. No.: 13/037,867

(22) Filed: Mar. 1, 2011

(65) Prior Publication Data

US 2012/0224783 A1    Sep. 6, 2012

(51) Int. Cl.
*G06K 9/40* (2006.01)
*G06K 9/56* (2006.01)

(52) U.S. Cl.
USPC .......................................... 382/260; 382/308

(58) Field of Classification Search
USPC ......... 382/275, 168, 169, 172, 228, 254, 270; 358/527, 3.26, 463, 1.9, 3.23, 450, 358/464; 348/241, 251, 222.1, 224.1
See application file for complete search history.

(56) References Cited

U.S. PATENT DOCUMENTS

| | | | |
|---|---|---|---|
| 5,742,354 A | 4/1998 | Vlahos et al. | |
| 6,670,988 B1 | 12/2003 | Gallagher et al. | |
| 6,711,306 B1 * | 3/2004 | Denber | 382/308 |
| 6,771,838 B1 * | 8/2004 | Fan | 382/274 |
| 6,806,980 B2 | 10/2004 | Xu et al. | |
| 6,833,862 B1 | 12/2004 | Li | |
| 6,941,027 B1 | 9/2005 | Gallagher | |
| 6,987,886 B1 | 1/2006 | Okubo et al. | |
| 7,050,650 B2 * | 5/2006 | Maurer et al. | 382/275 |
| 7,453,502 B2 * | 11/2008 | Schweng | 348/241 |
| 7,609,883 B1 | 10/2009 | Warnock | |
| 7,634,152 B2 | 12/2009 | Silverstein | |
| 7,692,700 B2 | 4/2010 | Johannesson et al. | |
| 8,014,596 B2 | 9/2011 | Campbell et al. | |
| 2002/0145769 A1 | 10/2002 | Pollard | |
| 2004/0046894 A1 * | 3/2004 | Adams, Jr. et al. | 348/624 |
| 2004/0070677 A1 * | 4/2004 | Adams et al. | 348/222.1 |
| 2005/0163374 A1 * | 7/2005 | Ferman et al. | 382/176 |
| 2007/0146506 A1 | 6/2007 | Lin et al. | |
| 2007/0211154 A1 | 9/2007 | Mahmoud et al. | |
| 2007/0236594 A1 | 10/2007 | Hasan et al. | |
| 2007/0262235 A1 | 11/2007 | Pertsel | |

(Continued)

FOREIGN PATENT DOCUMENTS

| | | | |
|---|---|---|---|
| JP | 61080474 A | 4/1986 | |
| JP | 4281671 A | 10/1992 | |

(Continued)

OTHER PUBLICATIONS

Japanese Office Action—Patent Application No. 2012-034514—Mailing Date Feb. 12, 2013.

*Primary Examiner* — Andrae S Allison
(74) *Attorney, Agent, or Firm* — Kristine Elizabeth Matthews; David C. Ripma

(57) ABSTRACT

Aspects of the present invention are related to systems and methods for correcting illumination and vignette in a camera-captured document image. A background type may be detected from down-sampled luminance image associated with the camera-captured image, and model parameters may be estimated for a morphologically filtered version of the down-sampled luminance image, wherein the morphological filter may be based on the detected background type. The model parameters may be verified and if deemed acceptable, a rectified image may be formed.

20 Claims, 7 Drawing Sheets

(56) References Cited

U.S. PATENT DOCUMENTS

| | | | |
|---|---|---|---|
| 2008/0056573 A1* | 3/2008 | Matsuda et al. | 382/176 |
| 2008/0284879 A1 | 11/2008 | Hu | |
| 2008/0285094 A1 | 11/2008 | Hatzav et al. | |
| 2009/0110319 A1* | 4/2009 | Campbell et al. | 382/260 |
| 2009/0231483 A1 | 9/2009 | Seddik et al. | |

FOREIGN PATENT DOCUMENTS

| | | |
|---|---|---|
| JP | 6131455 A | 5/1994 |
| JP | 9018711 A | 1/1997 |
| JP | 2001136438 A | 5/2001 |
| JP | 2006014094 A | 1/2006 |

* cited by examiner

METHODS AND SYSTEMS FOR DOCUMENT-IMAGE CORRECTION

FIELD OF THE INVENTION

Embodiments of the present invention relate generally to artifact removal in a digital image and, in particular, to methods and systems for the removal of illumination variation and the correction of optical vignette in a camera-captured document image.

BACKGROUND

A camera-captured document image may suffer from artifacts due to many factors, for example, non-uniform illumination, glare, optical distortion, perspective distortion, lens-light fall off, also referred to as optical vignette, and other artifact-generating factors. A camera-captured document image may exhibit a non-uniform brightness appearance due to non-uniform illumination and/or optical vignette. The uneven-brightness appearance of a camera-captured document image may affect document segmentation, result in lowered text contrast and reduce the overall perceptual image quality of the document reproduction. Correcting a camera-captured document image for these artifacts may be made more challenging by the fact that a camera-captured document image may contain areas beyond the document region, and these areas may contain clutter. Additionally, documents often have complex layouts containing, for example, multi-colored backgrounds, color gradations and other complex-layout features, making it ambiguous whether uneven brightness in the document image is the result of illumination variation, optical vignette or variations in content. Therefore, methods and systems, for correcting illumination and vignette in a camera-captured document image, capable of robust performance under these conditions may be desirable.

SUMMARY

Some embodiments of the present invention comprise methods and systems for removing artifacts from a digital image, wherein the digital image is a camera-captured document image.

According to a first aspect of the present invention, a luminance image may be down-sampled, and a background type may be determined from the down-sampled luminance image. Model parameters may be estimated from a morphologically filtered version of the down-sampled luminance image, wherein the morphological filter operation may be determined according to the detected background type. The model parameters may be verified, and based on the acceptability of the model parameters a rectified image may be generated. If the model parameters are acceptable, then a rectified image may be generated. If the model parameters are not acceptable, then a rectified image may not be generated. The rectified image may be based on a goal luminance value, a blending image and a boosted image.

The foregoing and other objectives, features and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or a computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

A camera-captured document image may suffer from artifacts due to many factors, for example, non-uniform illumination, glare, optical distortion, perspective distortion, lens-light fall off, also referred to as optical vignette, and other artifact-generating factors. A camera-captured document image may exhibit a non-uniform brightness appearance due to non-uniform illumination and/or optical vignette. The uneven-brightness appearance of a camera-captured document image may affect document segmentation, result in lowered text contrast and reduce the overall perceptual image quality of the document reproduction. Correcting a camera-captured document image for these artifacts may be made more challenging by the fact that a camera-captured document image may contain areas beyond the document region, and these areas may contain clutter. Additionally, documents often have complex layouts containing, for example, multi-colored backgrounds, color gradations and other complex-layout features, making it ambiguous whether uneven brightness in the document image is the result of illumination variation, optical vignette or variations in content. Therefore, methods and systems, for correcting illumination and vignette in a camera-captured document image, capable of robust performance under these conditions may be desirable.

Embodiments of the present invention may process and modify a luminance image. The luminance image may be a luminance-channel image associated with a color image, for example the Y channel of a YCbCr image, the L channel of an La*b* image and other luminance-channel images extracted from a color image. Alternatively, the luminance image may be a single-channel gray-scale image.

Figure 1:
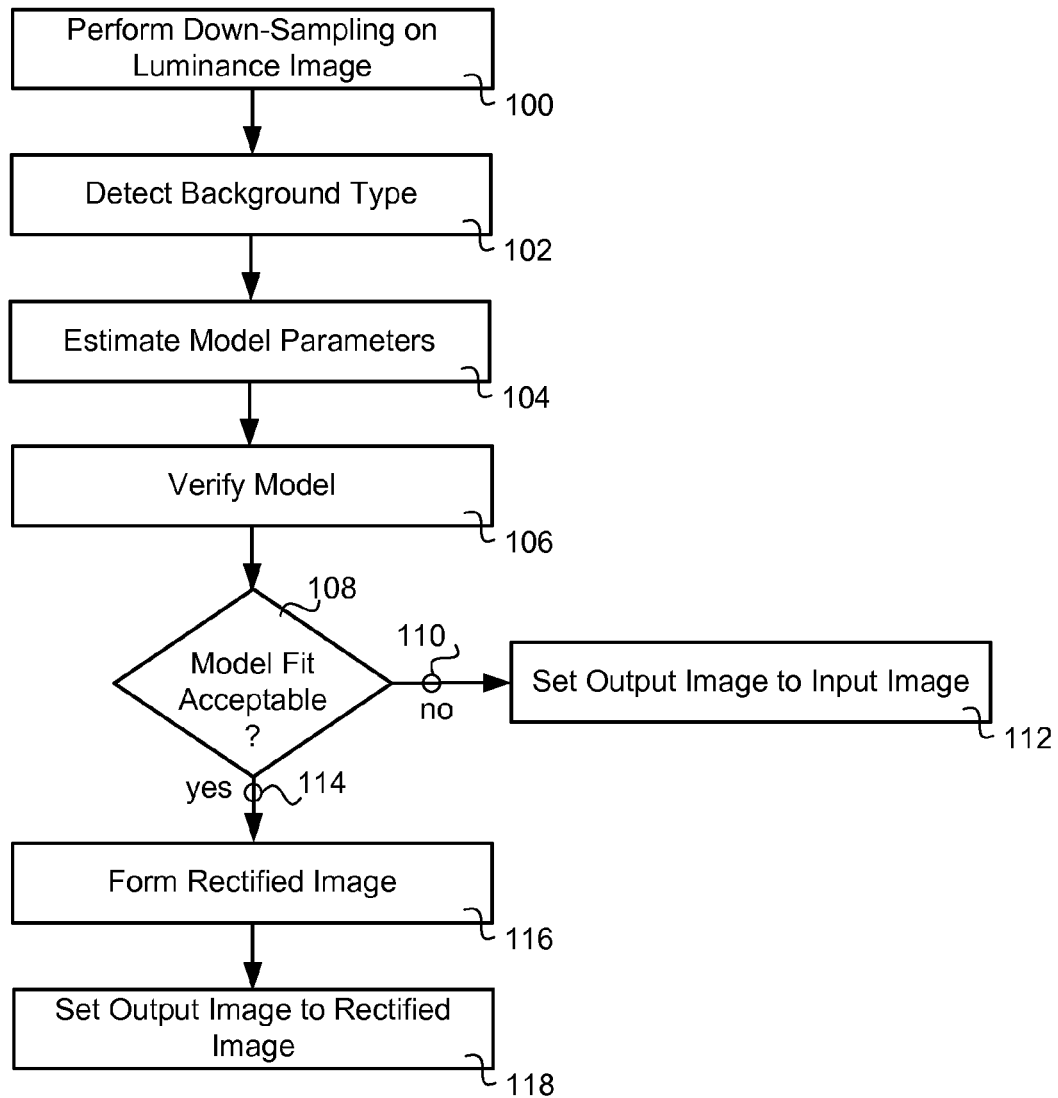
FIG. 1 is a chart showing exemplary embodiments of the present invention comprising down-sampling, background detection, model-parameter estimation, model verification and image rectification based on model verification.

Embodiments of the present invention may be understood in relation to FIG. 1. In these embodiments of the present invention, an input luminance image, which may be denoted L, comprising a document region-of-interest corresponding to the likely document pixels in a camera-captured image may be down sampled 100 to form a down-sampled image, which may be denoted $L_r$, that may be significantly smaller than the input luminance image, L. In some embodiments of the present invention, nearest-neighbor sub-sampling may be used to down-sample 100 the input luminance image. In alternative embodiments, alternative methods of down-sampling may be used.

The background type may be detected 102 from the input luminance image, L. In some embodiments of the present invention, the background type may be labeled as "Normal" when the background region is lighter than the foreground objects, for example, dark text on a light background, and the background type may be labeled as "Reverse" when the background region is darker than the foreground objects, for example, light text on a dark background. In alternative embodiments of the present invention, alternative labels may be used in association with these two categories to convey the background type.

Figure 2:
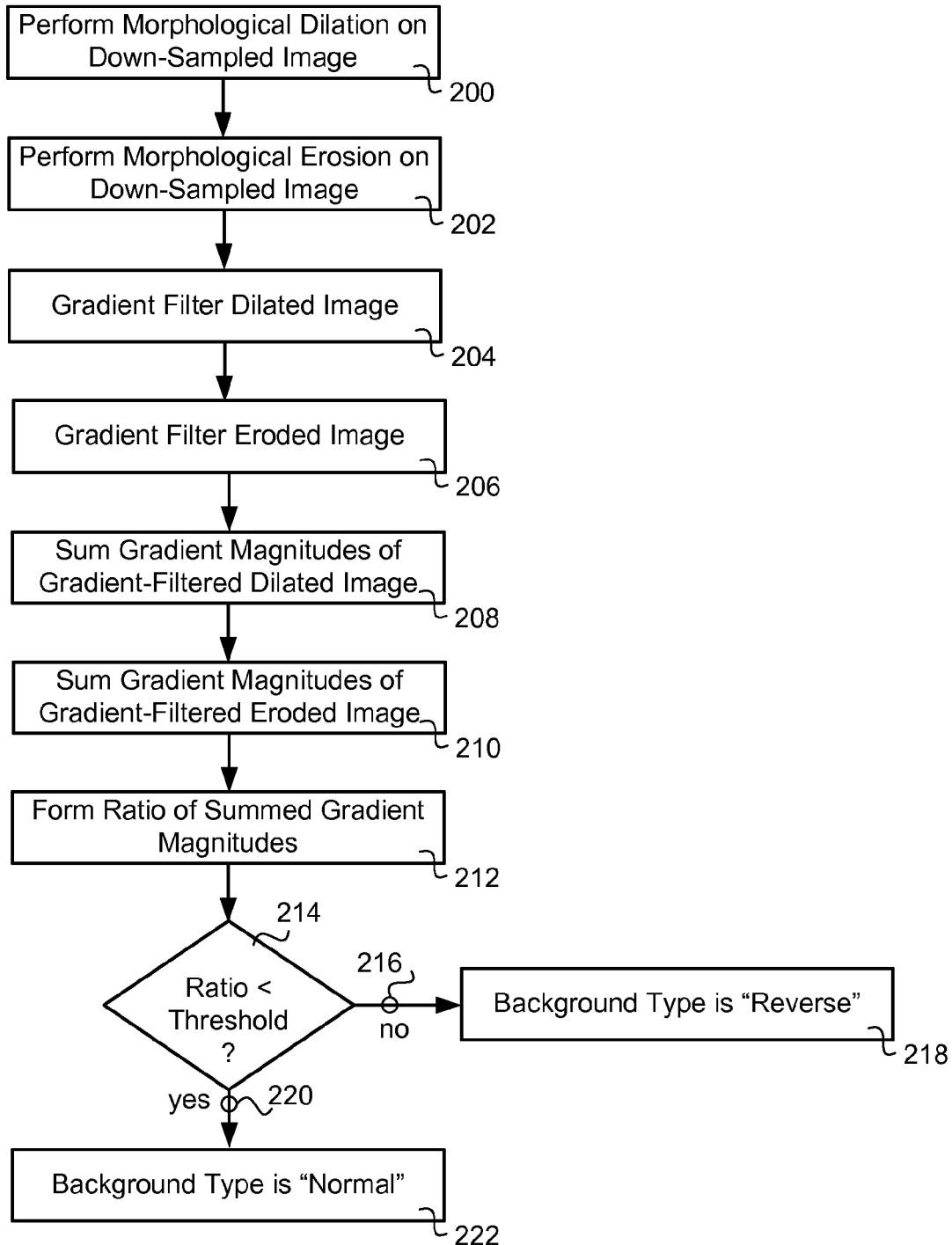
FIG. 2 is a chart showing exemplary embodiments of the present invention comprising background-type detection.

In some embodiments of the present invention, background detection 102 may be performed according to FIG. 2. In these embodiments, a dilated image, which may be denoted $L_{lightbias}$, may be generated by performing gray-level morphological dilation 200, by a structuring element d, on the down-sampled image, $L_r$. Performing gray-level morphological dilation 200 may effectuate the filling of dark pixels with the values from brighter neighboring pixels. For images comprising dark text on a light background, performing gray-level morphological dilation 200 may in-paint dark text pixels with lighter background values, thus generating a more uniform image region. For images comprising light text on a darker background, performing gray-level morphological dilation 200 may spread the text luminance into the background region.

An eroded image, which may be denoted $L_{darkbias}$, may be generated by performing gray-level morphological erosion 202, by the structuring element d, on the down-sampled image, $L_r$. Performing gray-level morphological erosion 202 may effectuate the filling of lighter pixels with the values from darker neighboring pixels. For images comprising light text on a light background, performing gray-level morphological erosion 202 may in-paint light text pixels with darker background values, thus generating a more uniform image region. For images comprising dark text on a lighter background, performing gray-level morphological erosion 202 may spread the text luminance into the background region.

A Laplacian gradient filter may be applied 204 to the dilated image, and a Laplacian gradient filter may be applied 206 to the eroded image. The gradient magnitudes of the gradient-filtered dilated image may be summed 208, and the gradient magnitudes of the gradient-filtered eroded image may be summed 210. A ratio may be formed 212 according to:

$$R = \frac{\sum |\Delta L_{lightbias}|}{\sum |\Delta L_{darkbias}|},$$

where $\Delta L_{lightbias}$ and $\Delta L_{darkbias}$ denote the gradient-filtered dilated image and the gradient-filtered eroded image, respectively, and |•| denotes the magnitude operator.

When the ratio, R, is less than 220 a threshold, which may be denoted $T_R$ and may be referred to as a ratio threshold, then the background type may be considered "Normal" 222 corresponding to a background that is lighter than the associated foreground elements, for example, text. When the ratio, R, is not less than 216 the threshold, $T_R$, then the background type may be considered "Reverse" 218 corresponding to a background that is darker than the associated foreground elements, for example, text. In an exemplary embodiment of the present invention, the threshold, $T_R$, may be set to a value of 1.1, thereby providing a slight bias in the background-type detection to "Normal" text backgrounds. A person having ordinary skill in the art will recognize that the same classification may be effectuated defining the ratio as the inverse of the above-defined ratio and correspondingly adjusting the threshold criterion. Additionally, alternative threshold criteria may effectuate the same classification.

Figure 3:
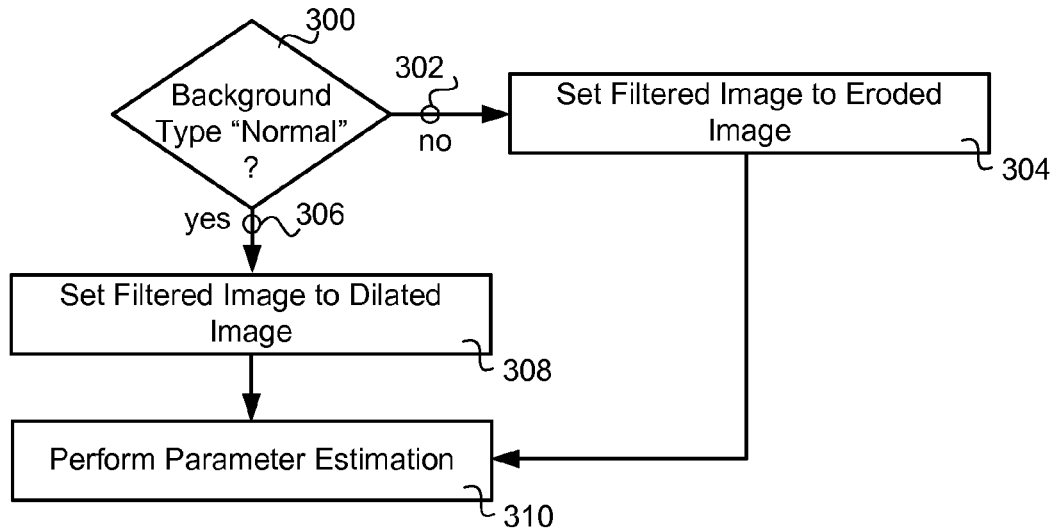
FIG. 3 is a chart showing exemplary embodiments of the present invention comprising model-parameter estimation.

Returning to FIG. 1, model parameters may be estimated 104. In some embodiments of the present invention, the model parameters may be estimated according to FIG. 3. The background type may be examined 300. If the background type is "Normal" 306, then an image from which the filter parameters may be estimated may be set 308 to the dilated image, $L_{lightbias}$. Otherwise, if the background type is "Reverse" 302, then the image from which the filter parameters may be estimated may set 304 to the eroded image, $L_{darkbias}$. The image from which the filter parameters may be estimated may be denoted $L_{filtered}$ and may be referred to as a filtered image. A set of pixel coordinates that identify the document region-of-interest may be denoted Z={(x, y): $ROI_{mask}$ (x, y)=1}, where $ROI_{mask}$ denotes a document region-of-interest mask and (x, y) denotes a pixel location. Parameter estimation may be performed 310 to fit a second-order polynomial model, $L_{filtered}$ (x, y)=$ax^2+bxy+cy^2+dx+ey+f$, to the pixel values in $L_{filtered}$ corresponding to the coordinates indicated by Z, where a, b, c, d, e, f are the estimated model parameters.

Returning to FIG. 1, after estimation of the model parameters 104, the model may be verified 106. Model verification 106 may comprise calculation of a measure of the difference between the luminance values $L_{filtered}$ (x, y) and the corresponding luminance values predicted by the model, $ax^2+bxy+cy^2+dx+ey+f$. In some embodiments of the present invention, an average model difference, which may be denoted $m_{diff}$, may be calculated according to:

$$m_{diff} = \frac{1}{|Z|}\sum_Z |L_{filtered}(x, y) - (ax^2 + bxy + cy^2 + dx + ey + f)|,$$

where |Z| denotes the cardinality, or number of pixels, in Z. In alternative embodiments, the difference between the luminance values $L_{filtered}$ (x, y) and the corresponding luminance values predicted by the model, $ax^2+bxy+cy^2+dx+ey+f$, may be determined according to alternative measures, for example, the mean-squared-distance calculated during the least-squares fit.

The measure of the difference between the luminance values $L_{filtered}$ (x, y) and the corresponding luminance values predicted by the model, $ax^2+bxy+cy^2+dx+ey+f$, may be examined 108 to determine if the model fit is acceptable. If the model fit is not 110 acceptable, then the output image, which may be denoted $L_{out}$, may be set 112 to the input luminance image. If the model fit is 114 acceptable, then a rectified image, which may be denoted $L_{rectified}$, may be formed 116 and set 118 as the output image. In some embodiments of the present invention, a model may be considered acceptable 114 when $m_{diff} < \theta$, where $\theta$ is an acceptance threshold, for example, 10.0, and the model may otherwise not be considered $$L_{out} = \begin{cases} L_{rectified} & m_{diff} < \theta \\ L & \text{otherwise} \end{cases}$$

in these embodiments. In some embodiments of the present invention, the acceptance threshold, $\theta$, may be determined heuristically and tested on a large test set of real imagery.

Figure 4:
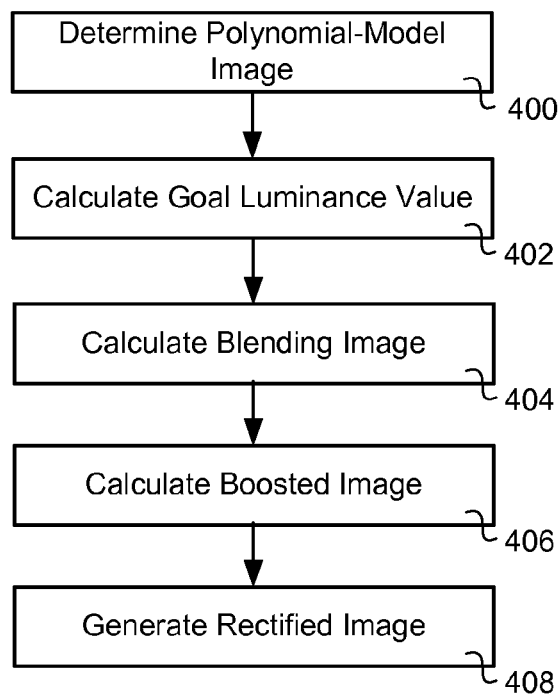
FIG. 4 is a chart showing exemplary embodiments of the present invention comprising generation of a rectified image.

In some embodiments of the present invention, a rectified image may be formed 116 in accordance with FIG. 4. In these embodiments, the polynomial-model image, which may be denoted $L_{fit}$, may be determined 400. The polynomial-model image may be the image created using the estimated polynomial model of the luminance variation. Thus, $L_{fit}(x, y) = ax^2 + bxy + cy^2 + dx + ey + f$. In some embodiments, the polynomial-model image may be calculated and stored during previous operations, for example, model verification, and may be retrieved in this determination 400 step. In alternative embodiments, the polynomial-model image may be calculated during the determination 400 step.

A goal luminance value may be calculated 402 according to:

$$g_{value} = \begin{cases} \max(L_{fit}) & btype = \text{"Normal"} \\ \min(L_{fit}) & btype = \text{"Reverse"} \end{cases}$$

where $g_{value}$ denotes the goal luminance value and btype indicates the background type.

A blending image, which may be denoted B, varying in value from one to zero, may be calculated 404. The blending image may be calculated according to:

$$B = \frac{(\max(D_L) - D_L)}{\max(D_L)},$$

where $D_L = |L - L_{fit}|$. Thus, the blending image value at a pixel will be smaller when the input luminance-image pixel value is closer to the luminance model pixel value than when the input luminance-image pixel value is further from the luminance model pixel value. The blending image may be used to adjust the luminance correction across the image based on how well a luminance value at a pixel matches the corresponding model value.

A boosted image, which may be denoted $L_{boost}$, may be calculated 406 according to:

$$L_{boost} = L + B.*(g_{value} - L_{fit}),$$

where .* denotes the pixel product and $(g_{value} - L_{fit})$ denotes an element-by-element subtraction of the value $g_{value}$ from the elements of $L_{fit}$.

A rectified image may be generated 408 according to:

$$L_{rectified} = \frac{\max(L)}{\max(L_{boost})} L_{boost}.$$

Figure 5:
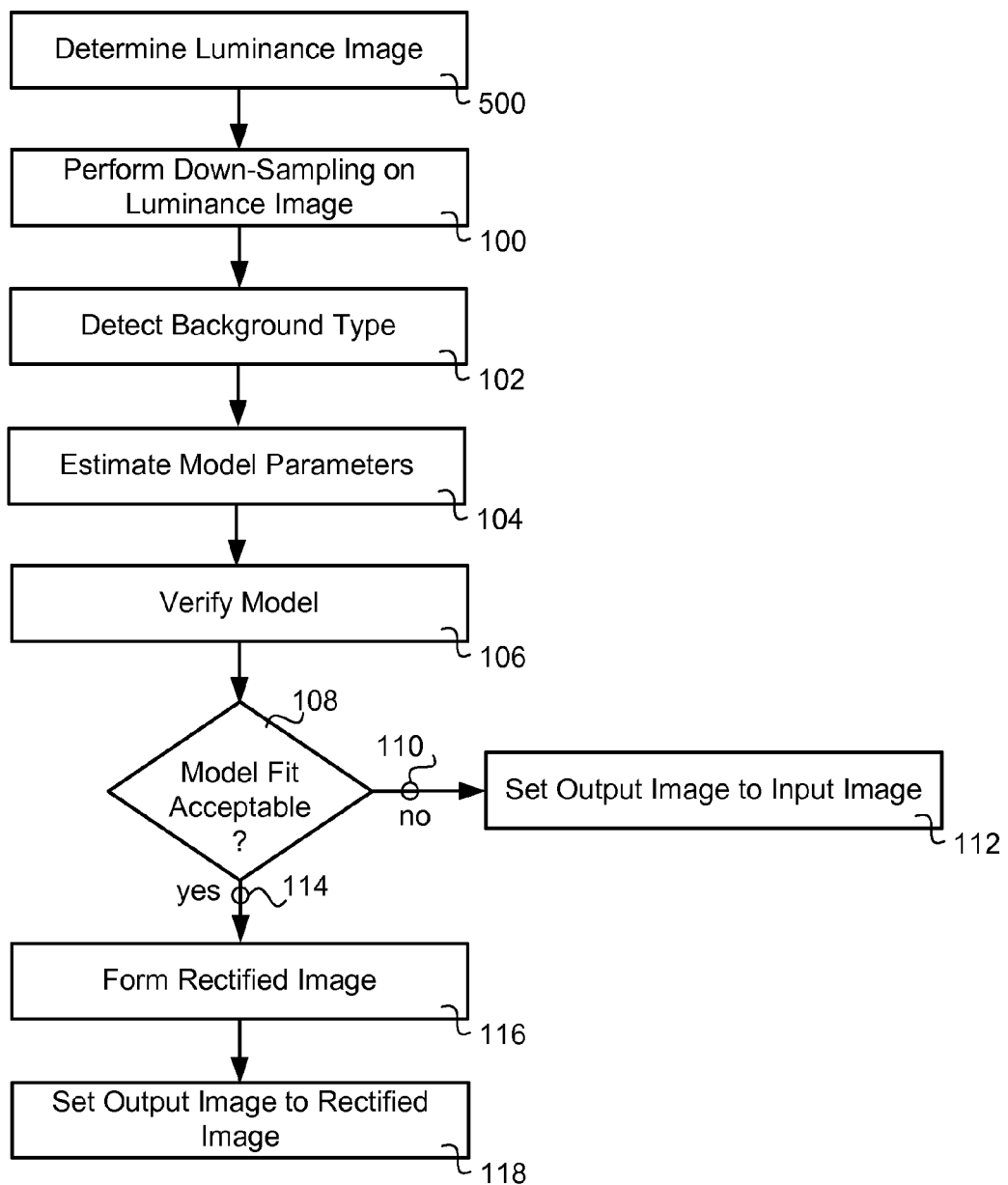
FIG. 5 is a chart showing exemplary embodiments of the present invention comprising extraction of a luminance image from a color image.

In alternative embodiments of the present invention described in relation to FIG. 5, a luminance image may be determined 500 from a multi-channel input image prior to the processing described herein in relation to FIG. 1.

Figure 6:
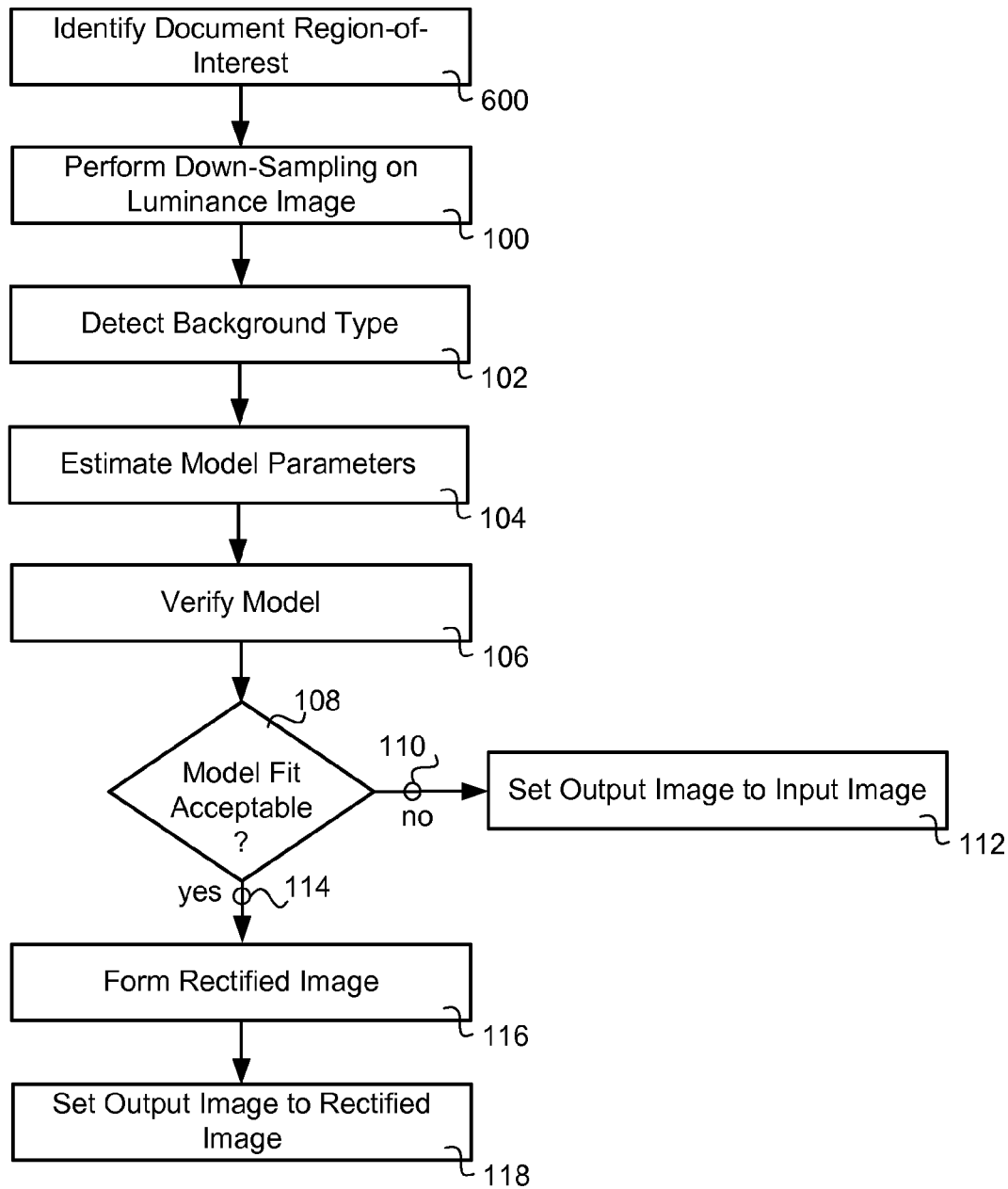
FIG. 6 is a chart showing exemplary embodiments of the present invention comprising document region-of-interest detection.

In alternative embodiments of the present invention described in relation to FIG. 6, a document region-of-interest may be identified 600 from an input luminance image prior to the processing described herein in relation to FIG. 1. The document region-of-interest may be indicated by a document region-of-interest mask.

Figure 7:
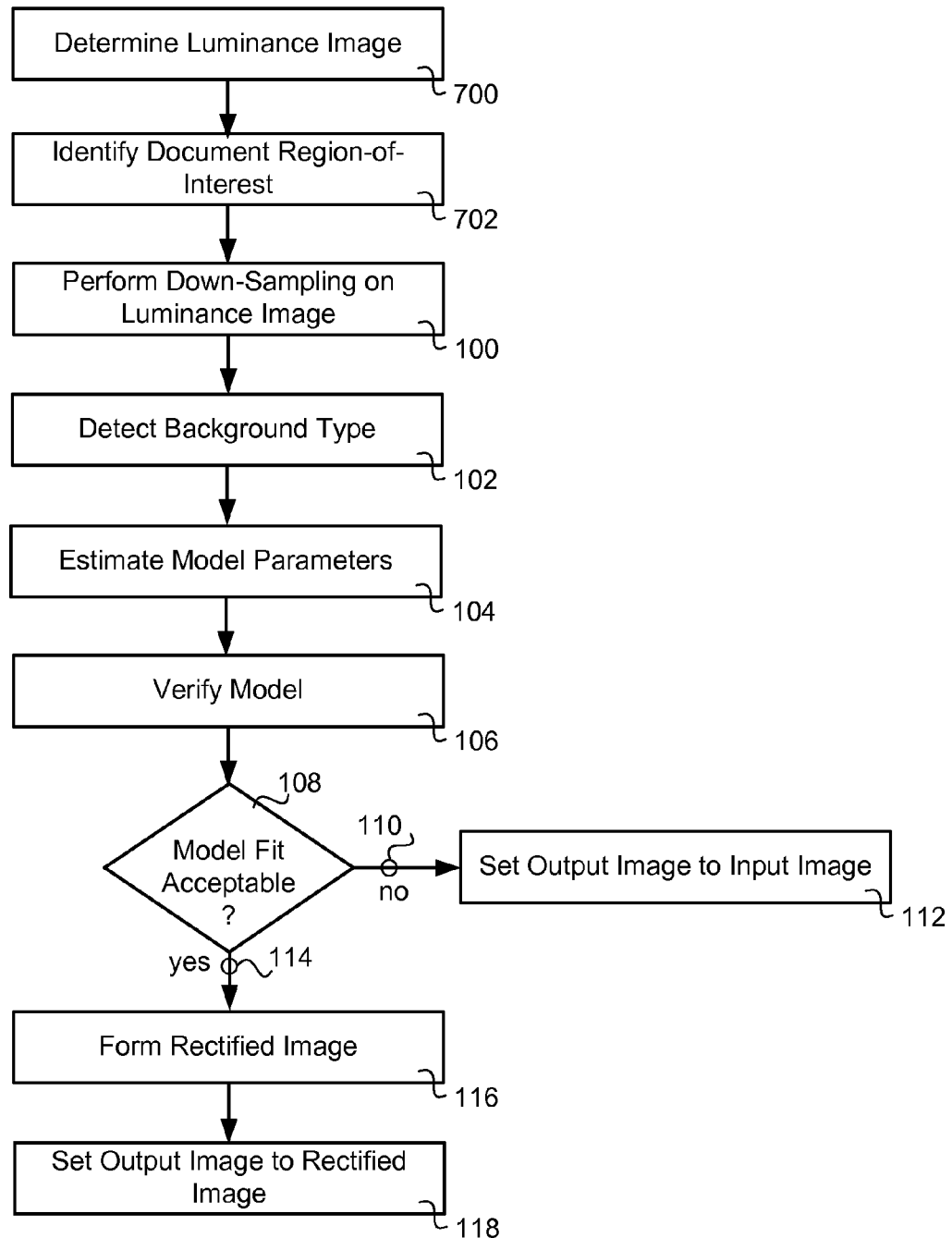
FIG. 7 is a chart showing exemplary embodiments of the present invention comprising extraction of a luminance image from a color image and document region-of-interest detection.

In alternative embodiments of the present invention described in relation to FIG. 7, prior to the processing described herein in relation to FIG. 1, a luminance image may be determined 700 from a multi-channel input image, and a document region-of-interest may be identified 702 from the luminance image.

In some embodiments of the present invention, identification of a document region-of-interest may be performed by a method, system or apparatus as described in U.S. patent application Ser. No. 13/034,594, entitled "Methods and Systems for Determining a Document Region-of-Interest in an Image," filed on Feb. 24, 2011, invented by Ahmet Mufit Ferman and Lawrence Shao-hsien Chen, said U.S. patent application Ser. No. 13/034,594 is hereby incorporated by reference herein in its entirety.

Figure 8:
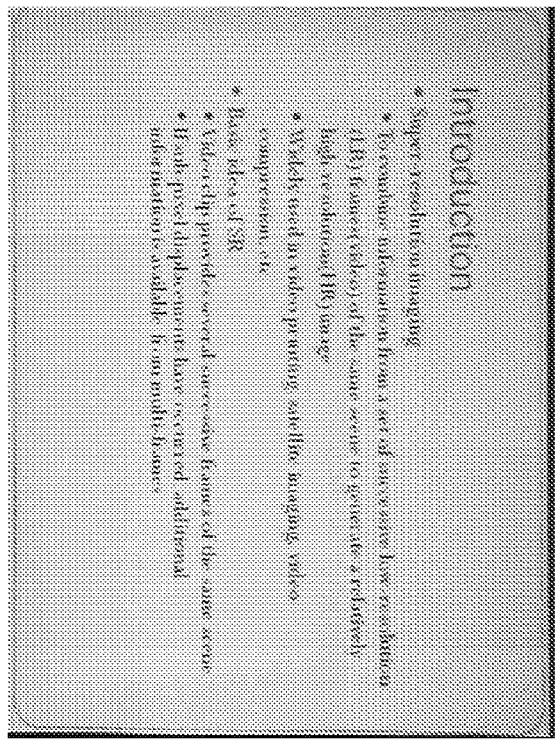
FIG. 8 is an exemplary image exhibiting non-uniform background due to optical vignette.
Figure 9:
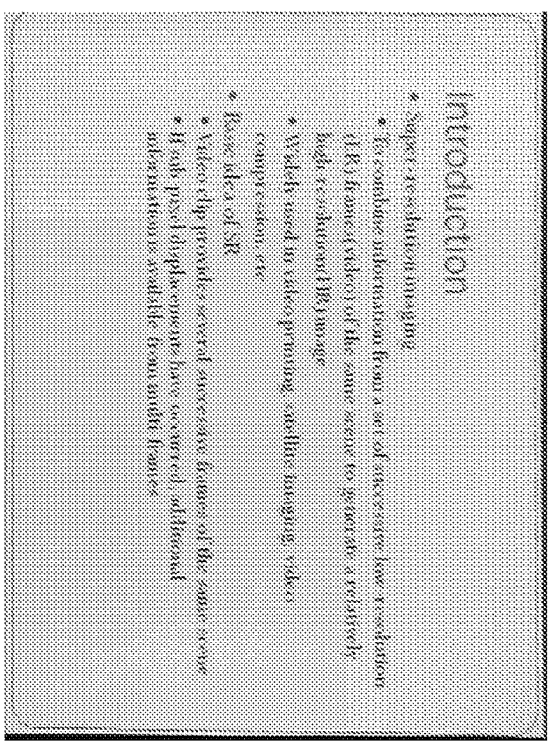
FIG. 9 is a rectified image, associated with the exemplary image of FIG. 8, generated according to embodiments of the present invention.

FIG. 8 depicts an exemplary camera-captured image 800 exhibiting a non-uniform background brightness due to optical vignette, and FIG. 9 depicts a corrected image 900, corresponding to the exemplary image 800 of FIG. 8, corrected according to embodiments of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that software, hardware and/or firmware may be created by one of ordinary skill in the art to carry out the various logical functions described herein.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for removing artifacts from a digital image, said method comprising:
   down-sampling a luminance image associated with a digital image;
   detecting a background type associated with said down-sampled luminance image;
   estimating model parameters associated with a morphologically filtered version of said down-sampled luminance image;
   verifying said estimated model parameters, wherein said verifying comprises:
      calculating a difference between said filtered image and an image generated using said estimated parameters and a document region-of-interest;
      comparing said calculated difference to an acceptance threshold; and
      indicating said estimated model parameters are acceptable when said calculated difference meets a first criterion in relation to said acceptance threshold; and
   generating a rectified image associated with said luminance image when said verifying indicates said estimated model parameters are acceptable.

2. A method as described in claim 1, wherein said detecting comprises:
   performing a morphological dilation on said down-sampled luminance image, thereby producing a dilated image;
   performing a morphological erosion on said down-sampled luminance image, thereby producing an eroded image;
   filtering said dilated image using a gradient filter, thereby producing a gradient-filtered dilated image;
   filtering said eroded image using said gradient filter, thereby producing a gradient-filtered eroded image;
   summing the gradient magnitudes of said gradient-filtered dilated image, thereby producing a first sum;
   summing the gradient magnitudes of said gradient-filtered eroded image, thereby producing a second sum;
   forming the ratio of said first sum and said second sum; and
   indicating said background type is a first category when said ratio meets a second criterion in relation to a ratio threshold.

3. A method as described in claim 2, wherein said gradient filter is a Laplacian gradient filter.

4. A method as described in claim 2, wherein:
   said ratio is said first sum divided by said second sum;
   said second criterion is met when said ratio is less than said ratio threshold; and
   said first category is associated with a dark foreground element on a lighter background.

5. A method as described in claim 2, wherein:
   said ratio is said first sum divided by said second sum;
   said second criterion is met when said ratio is not less than said ratio threshold; and
   said first category is associated with a light foreground element on a darker background.

6. A method as described in claim 2, wherein said ratio threshold is biased towards a dark text element on a lighter background.

7. A method as described in claim 2, wherein said estimating comprises:
   when said detected background type is associated with a dark foreground element on a light background, setting a filtered image to said dilated image;
   when said detected background type is associated with a light foreground element on a dark background, setting said filtered image to said eroded image; and
   estimating a plurality of parameters associated with a second-order polynomial model for said filtered image.

8. A method as described in claim 7, wherein said estimating said plurality of parameters comprises performing a least-squares fit.

9. A method as described in claim 1 further comprising:
   when said calculated difference does not meet said first criterion in relation to said acceptance threshold, setting an output image to said luminance image.

10. A method as described in claim 1, wherein said generating comprises:
    determining a polynomial-model image using said estimated model parameters;
    calculating a goal luminance value;
    calculating a blending image;
    calculating a boosted image using said blending image and said goal luminance value; and
    forming said rectified image using said boosted image.

11. A method as described in claim 10, wherein said calculating a goal luminance value comprises:
    when said background type is associated with a dark foreground element on a light background:
       determining a maximum pixel value from said polynomial-model image; and
       setting said goal luminance value to said determined maximum pixel value; and
    when said background type is associated with a light foreground element on a dark background:
       determining a minimum pixel value from said polynomial-model image; and
       setting said goal luminance value to said determined minimum pixel value.

12. A method as described in claim 10, wherein said calculating a blending image comprises:
    calculating an absolute difference image between said luminance image and said polynomial model image;
    determining a maximum pixel value from said calculated absolute difference image;
    subtracting a first pixel value corresponding to a first pixel location in said calculated difference image from said determined maximum pixel value;
    dividing a value generated by said subtracting by said determined maximum pixel value; and
    associating said value generated by said dividing with a pixel location in said blending image corresponding to said first pixel location.

13. A method as described in claim 10, wherein said calculating a boosted image comprises:
    subtracting a first pixel value corresponding to a first pixel location in said polynomial-model image from said goal luminance value;
    multiplying said value generated by said subtracting by a blending image pixel value corresponding to said first pixel location in said blending image;
    adding said value generated by said multiplying to a luminance image pixel value corresponding to said first pixel location in said luminance image; and associating said value generated by said adding with a pixel location in said boosted image corresponding to said first pixel location.

14. A method as described in claim 10, wherein said forming said rectified image comprises:
determining a first maximum pixel value from said luminance image;
determining a second maximum pixel value from said boosted image; and
associating a value generated by multiplying said first maximum pixel value, a multiplicative inverse of said second maximum pixel value and a first pixel value associated with a first pixel location in said boosted image with a pixel location in said rectified image corresponding to said first pixel location.

15. A method as described in claim 1 further comprising extracting said luminance image from said digital image.

16. A method as described in claim 1 further comprising determining a document region-of-interest from said luminance image.

17. A method as described in claim 16, wherein said determining a document region-of-interest comprises determining a document region-of-interest mask.

18. A non-transitory computer-readable medium encoded with a computer program code for implementing a method for removing artifacts from a digital image, said method comprising:
down-sampling a luminance image associated with a digital image;
detecting a background type associated with said down-sampled luminance image;
estimating model parameters associated with a morphologically filtered version of said down-sampled luminance image;
verifying said estimated model parameters, wherein said verifying comprises:
calculating a difference between said filtered image and an image generated using said estimated parameters and a document region-of-interest;
comparing said calculated difference to an acceptance threshold; and
indicating said estimated model parameters are acceptable when said calculated difference meets a first criterion in relation to said acceptance threshold; and
generating a rectified image associated with said luminance image when said verifying indicates said estimated model parameters are acceptable.

19. A computer-readable medium as described in claim 18, said method further comprising:
when said calculated difference does not meet said first criterion in relation to said acceptance threshold, setting an output image to said luminance image.

20. A computer-readable medium as described in claim 18, wherein, in said method, said generating comprises:
determining a polynomial-model image using said estimated model parameters;
calculating a goal luminance value;
calculating a blending image;
calculating a boosted image using said blending image and said goal luminance value; and
forming said rectified image using said boosted image.

* * * * *